(12) United States Patent
Huth et al.

(10) Patent No.: US 12,018,991 B2
(45) Date of Patent: Jun. 25, 2024

(54) PIPELINE UTILIZING THICK-MATTER PUMP FOR DETERMINING A PRESSURE AND/OR A WALL THICKNESS SIMPLY, DURABLY AND RELIABLY

(71) Applicant: Putzmeister Engineering GmbH, Aichtal (DE)

(72) Inventors: Tobias Huth, Stuttgart (DE); Knut Kasten, Ostfildern (DE); Ansgar Mueller, Stuttgart (DE)

(73) Assignee: Putzmeister Engineering GmbH, Aichtal (DE)

( * ) Notice: Subject to any disclaimer, the term of this patent is extended or adjusted under 35 U.S.C. 154(b) by 353 days.

(21) Appl. No.: 17/594,799

(22) PCT Filed: Apr. 7, 2020

(86) PCT No.: PCT/EP2020/059846
§ 371 (c)(1),
(2) Date: Oct. 29, 2021

(87) PCT Pub. No.: WO2020/221560
PCT Pub. Date: Nov. 5, 2020

(65) Prior Publication Data
US 2022/0205858 A1 Jun. 30, 2022

(30) Foreign Application Priority Data
Apr. 30, 2019 (DE) ................... 10 2019 206 202.4

(51) Int. Cl.
*G01L 7/00* (2006.01)
*F04B 15/02* (2006.01)
(Continued)

(52) U.S. Cl.
CPC .............. *G01L 7/022* (2013.01); *F04B 15/02* (2013.01); *F04B 53/16* (2013.01); *F16L 9/18* (2013.01); *F16L 57/06* (2013.01)

(58) Field of Classification Search
None
See application file for complete search history.

(56) References Cited

U.S. PATENT DOCUMENTS

| 5,578,752 A | 11/1996 | Schlecht et al. |
| 6,955,087 B2 | 10/2005 | Perini et al. |
| (Continued) | | |

FOREIGN PATENT DOCUMENTS

| DE | 42 06 576 A1 | 9/1993 |
| DE | 197 27 102 A1 | 1/1999 |
| (Continued) | | |

OTHER PUBLICATIONS

International Search Report (PCT/ISA/210) issued in PCT Application No. PCT/EP2020/059846 dated Jul. 3, 2020 with English translation (four (4) pages).

(Continued)

*Primary Examiner* — Brandi N Hopkins
*Assistant Examiner* — Nigel H Plumb
(74) *Attorney, Agent, or Firm* — Crowell & Moring LLP

(57) ABSTRACT

A pipeline for conveying concrete determines a pressure in and/or a wall thickness of the pipeline, wherein a first length portion of the pipeline has a first wall thickness and a second length portion of the pipeline has a second wall thickness greater than the first wall thickness. The determination is made using a first strain gauge on an outer side of the first length portion and a second strain gauge on an outer side of the second length portion, wherein the strain gauges are each fixedly applied to the outer side of the length portions. A strain gauge and/or the second longitudinal section of the (Continued)

pipeline are/is at a spacing from at least one end of the pipeline, which spacing corresponds to at least an internal diameter of the pipeline. By comparing strain gauge measurements, the wall thickness is determinable.

21 Claims, 4 Drawing Sheets

(51) Int. Cl.
  *F04B 53/16* (2006.01)
  *F16L 9/18* (2006.01)
  *F16L 57/06* (2006.01)
  *G01L 7/02* (2006.01)

(56) References Cited

U.S. PATENT DOCUMENTS

| | | |
|---|---|---|
| 10,488,281 B2 | 11/2019 | Burrow et al. |
| 10,495,534 B2 | 12/2019 | Kelly et al. |
| 10,732,063 B2 | 8/2020 | Szasz et al. |
| 2005/0072241 A1 * | 4/2005 | Perini .................. G01L 9/0002 73/700 |

FOREIGN PATENT DOCUMENTS

| | | | |
|---|---|---|---|
| DE | 19727102 A1 * | 1/1999 | ............ F04B 7/0096 |
| DE | 102 38 163 A1 | 2/2004 | |
| DE | 10238163 A1 * | 2/2004 | ............... G01L 7/02 |
| DE | 10 2015 109 450 A1 | 12/2016 | |
| DE | 10 2016 110 299 A1 | 12/2016 | |
| EP | 1 411 336 | 4/2004 | |
| EP | 1411336 A1 * | 4/2004 | ........... G01L 9/0002 |
| WO | WO 2019/032470 A1 | 2/2019 | |

OTHER PUBLICATIONS

German-language Written Opinion (PCT/ISA/237) issued in PCT Application No. PCT/EP2020/059846 dated Jul. 3, 2020 (six (6) pages).

* cited by examiner

PIPELINE UTILIZING THICK-MATTER PUMP FOR DETERMINING A PRESSURE AND/OR A WALL THICKNESS SIMPLY, DURABLY AND RELIABLY

FIELD OF THE INVENTION

The invention relates to a pipeline which is used, in particular, for the delivery of thick matter such as, for example, concrete, and to a method for the determination of a pressure in a pipeline of this type. Moreover, the invention relates to a thick-matter pump with a pipeline of this type.

BACKGROUND AND SUMMARY OF THE INVENTION

In pipelines for the delivery of thick matter such as, for example, concrete, as are used, in particular, in what is known as a mobile concrete pump, it is of importance for a pressure in the line and a wear state of this line to be determined and, in particular, a wall thickness. The determination of the pressure is important, in order for it to be possible for what are known as blockages to be determined very rapidly before they can be eliminated only with great effort or even can no longer be eliminated, and before direct mechanical damage can occur. The determination of the wear state is important because otherwise, especially if the thick matter is an abrasive material such as, for example, concrete with aggregate, a line can actually become thinner or can even wear through. Lines of this type can burst, especially in the case of the occurrence of a blockage, with a resulting risk for people who are present and an unexpected malfunction of a thick-matter pump.

The introduction of pressure sensors into the line is difficult and prone to faults, since these pressure sensors come directly into contact with the thick matter to be delivered, which causes difficulties especially in the case of concrete and damages the pressure sensors.

The invention is based on the problem of providing a pipeline mentioned at the outset, a thick-matter pump mentioned at the outset and a method mentioned at the outset for the determination of pressure and/or wall thickness in a pipeline of this type, by way of which problems of the prior art can be solved and it is possible, in particular, for it to be possible for a pressure and/or a wear state of the pipeline to be determined simply, durably and reliably.

This problem is solved by way of a pipeline, by way of the thick-matter pump, and by way of a method, in accordance with the independent claims. Advantageous and preferred refinements of the invention are contained in the dependent claims and will be described in greater detail in the following text. Here, some features are described only for the pipeline, only for the thick-matter pump or only for the method. Regardless of this, however, they should also be able to be applied both to a pipeline and to a thick-matter pump and to a method in a manner which is stand-alone and independent of one another. The wording of the claims is made a part of the contents of the description by way of express reference.

It is provided that the pipeline has determining means for the determination of a pressure in the pipeline and/or a wall thickness of the pipeline. A wear state of the pipeline can then be determined from the wall thickness of this line. Here, the pipeline is to advantageously serve for the delivery of thick matter such as, for example, concrete, with or without aggregate. The pipeline has a first longitudinal section with a first wall thickness and a second longitudinal section with a second wall thickness, this second wall thickness being greater than the first wall thickness. More longitudinal sections with different wall thicknesses can also be provided on the pipeline, but these two are provided in every case.

According to the invention, the abovementioned determining means have a first strain gauge on an outer side of the first longitudinal section and a second strain gauge on an outer side of the second longitudinal section. These two strain gauges are attached in each case firmly on their corresponding longitudinal sections or are attached on the outer side of the longitudinal sections. Thus, for example, they can be fastened directly thereto by way of a method which is selected from the group of adhesive bonding, screwing, welding, soldering, shrink-fitting or fastening by way of a clip which engages over them, in particular in the circumferential direction of the pipeline. As an alternative, the strain gauges can be placed, as it were, on the outer side of a longitudinal section and can then be fastened from the outside by way of fasteners, for which purpose, for example, an abovementioned clip can serve. It is important in every case that the strain gauges run on the outer side of the longitudinal sections and are not attached firmly merely in a punctiform manner, but rather are attached in such a way that they can detect a length change along the course or along their length, which length change is produced by way of an expansion and therefore widening of the pipeline in this region. An expansion of this type can occur not only between the ends of an elongate strain gauge, but rather also in a region in between. In every case, it is to be capable of being detected reliably and as accurately as possible.

In one advantageous refinement of the invention, the first strain gauge and the second strain gauge run in the same direction, or their working direction and their measuring direction is the same. The measured results can then also be compared directly, in order for it to be possible to extrapolate a possible expansion therefrom, which possible expansion in turn occurs because the pressure in the pipeline lies above a defined limit value or a wall thickness of the pipeline lies below a defined limit value, with the result that the pipeline widens or expands somewhat on account of the relatively low stability. Although widening of this type of the pipeline can be very low, it can nevertheless be detected accurately by way of the high accuracy of many strain gauges, such as strain gauge strips, for example.

Strain gauges can be generally selected from a group which comprises strain gauge strips, electrically conductive wires, force-measuring press-fit sensors and glass fibers. Strain gauge strips are known to a person skilled in the art from other applications, and are operated or actuated and evaluated electrically. Electrically conductive wires are actuated and evaluated electrically in a similar form. This also applies to the abovementioned force-measuring press-fit sensors. In the case of glass fibers, their length and therefore also a length change can be detected highly accurately in an optical manner as an expansion by way of measuring technology which is fundamentally available per se. To this end, the glass fibers are of specific configuration in some circumstances and have a plurality of reflection planes in the glass fiber which are produced as manufacturing defects during the glass fiber production and can be utilized in this way. As an alternative, artificially partially reflective mirrors can be introduced. This is also possible, to be precise even with acceptable outlay. As a result, as it were, part pieces are produced in the glass fiber or the glass fiber is divided into individual longitudinal sections, the length of which and therefore also length change of which can be measured individually. By way of the respective measurement according to the invention, the results are also directly comparable, in order for it to be possible for a possible expansion to be extrapolated therefrom. A very simple method (because its use is also frequently used for the measurement of deformations) comprises the use of strain gauge strips.

In one advantageous refinement of the invention, at least one strain gauge and/or the second longitudinal section of the pipeline are/is at a spacing from at least one end of the pipeline, which spacing corresponds at least to the internal diameter of the pipeline. This essentially means that a strain gauge or the second longitudinal section of the pipeline should not be arranged too close to one end of the pipeline. The spacing is advantageously even at least twice the internal diameter of the pipeline, with the result that there is a considerable spacing.

In a further refinement of the invention, the first strain gauge and the second strain gauge are of elongate configuration. Their length can be greater than the width. This advantageously applies, above all, to the abovementioned strain gauge strips. It can be provided that the two strain gauges are attached with the same orientation to the pipeline, as has been stated previously, and, if they are elongate, this is possible in a particularly satisfactory and defined manner. The extent can firstly be such that the longitudinal direction runs approximately along the longitudinal direction of the pipeline, advantageously precisely along the longitudinal direction of the pipeline. As an alternative, the longitudinal direction of the strain gauges can also differ from this, in particular can run at an angle between 10° and 90° with respect thereto. In the case of an angle of 90°, they run transversely with respect to the longitudinal direction of the pipeline or along the circumferential direction, and can then measure a change of the extent here.

In a further refinement of the invention, it is possible that at least one of the strain gauges is a strain gauge strip which has a plurality of part strips or is divided into a plurality of part strips. Here, each of these part strips forms a part strain gauge strip with a sensitivity along in each case precisely one direction, and precisely one measured value can be read off from it. Thus, for example, two part strain gauge strips can be provided in a strain gauge, which part strain gauge strips run at a right angle with respect to one another and can therefore measure, as it were, in two directions. Thus, as it were, an extent in a two-dimensional plane can be detected by this strain gauge strip with measuring means with two part strain gauge strips. A corresponding actuation and evaluation is also known for this purpose.

For the pipeline itself, it can be provided in one refinement of the invention that an internal diameter is identical in the two longitudinal sections. The pipeline advantageously runs exactly in a straight line, with the result that the internal diameters are also highly satisfactory comparable or the continuity of the internal diameters can be seen easily and clearly. The advantage of a pipeline of this type with a constant internal diameter can also lie in the fact that the abovementioned thick matter such as, for example, concrete can then be pumped through in a highly satisfactory manner and without pressure loss or too excessive a resistance.

In one refinement of the invention, it can be provided that the pipeline according to the invention has only the first longitudinal section and the second longitudinal section, that is to say a total of only two different wall thicknesses. This can mean that no further or different longitudinal sections with a different wall thickness and/or a different internal diameter or external diameter are provided. Customary flanges at the ends of the pipelines or other connecting means for the connection to further pipelines which are recognizably provided and configured for this purpose of connection are not to be counted here. A pipeline of this type can then be relatively short, for example can be only from 0.5 m to 1 m or even to 1.5 m in length. It then serves precisely for the purpose of the measurement of the pressure in a line during the delivery of thick matter or the like and possibly for the measurement of wear.

Here, it can be assumed for reasons of simplicity that wear in a pipeline is identical overall at least in the case of an identical internal diameter, in particular independently of where the pipeline is mounted on a thick-matter pump according to the invention, that is to say closer to the end or closer to the start of a delivery line.

In one possible refinement of the invention, the first longitudinal section can adjoin the second longitudinal section directly. Here, a transition in the wall thickness advantageously takes place between the two longitudinal sections. Firstly, it is possible that this transition between the first wall thickness and the second wall thickness is of abrupt configuration as a type of step. The step can be of directly angular configuration; as an alternative, it can be rounded on the interior angle, and possibly also on the exterior angle, and can have a radius of at least 2% of the internal diameter of the pipeline, preferably at least 5% or at least 10%. As an alternative, in another refinement of the invention, the transition can take place gradually, with the result that there is either a straight or an arcuate or curved flank in side view.

As has been indicated previously, a flange can be provided on the pipeline at at least one end. In this way, the pipeline can be hooked up to further lines or can be connected to further lines. The pipeline advantageously has in each case one flange at the two ends for an attachment or connection of this type.

In one advantageous refinement of the invention, each of the longitudinal regions has a constant external diameter, with the result that a longitudinal section is defined in each case precisely through this region of constant external diameter. As an alternative, an external diameter of the pipeline can change constantly, in particular even in the case of a constant internal diameter. There are then different external diameters and therefore different wall thicknesses at different points along the length of the pipeline, which results in the different longitudinal sections or the first longitudinal section and the second longitudinal section.

In a first advantageous refinement of the invention, the first longitudinal section and the second longitudinal section are produced in one piece and as one part. Therefore, the entire pipeline can be produced in one piece. This simplifies the production and results, above all, in a very stable pipeline.

In a second different refinement of the invention, the pipeline has a pipe with a continuously constant first wall thickness, in particular also with a continuously constant internal diameter and internal cross section. This pipe fundamentally forms the first longitudinal section. For the second longitudinal section, an outer pipe is placed onto the pipe as a cuff or, as an alternative, a clip, the cuff or clip forming an additional wall thickness in accordance with the desired difference between the first wall thickness and the second wall thickness. A pipeline of this type is therefore produced as two parts. For the firm connection, the cuff can be fastened to the pipeline, welding or shrink-fitting coming into question here. An alternative open clip can be clamped on by means of a screw or the like.

Not only is a wall thickness advantageously constant in the first longitudinal section and/or in the second longitudinal section, but rather also an internal diameter or internal cross section and an external diameter or external cross section. Respective identical and therefore also calculable and predictable ratios can then be assumed.

In one refinement of the invention, the second wall thickness is from 10% to 300% more than the first wall thickness, and is therefore considerably thicker. This is advantageously from 75% to 250% more, and can therefore be, approximately, the factor 2.

In a further possible refinement of the invention, a continuous inner pipe is arranged in the pipeline. This inner pipe has a constant internal diameter and a constant wall thickness; it is advantageously provided with a circular internal cross section. The wall thickness of the inner pipe can be smaller than the first wall thickness. It can thus be, for example, from 10% to 75% of the first wall thickness, and advantageously from 25% to 50%. The inner pipe preferably can bear flatly against the inner side of the two longitudinal sections, for example can also be connected firmly to it by way of shrink-fitting or thermal shrinking. The inner pipe can thus be virtually completely connected firmly to the pipeline. Furthermore, it is possible for this inner pipe to be configured in such a way that it is more wear-resistant than the pipeline otherwise. This applies, above all, to material which flows through it or thick matter to be delivered, in particular the abovementioned concrete. A pipeline can thus be made generally more wear-resistant. Furthermore, this can also be utilized for the measurement, for example as a comparison with other pipelines which are not provided with wear-resistant inner pipes of this type.

In the case of a thick-matter pump according to the invention which has a delivery line for the delivery of thick matter, at least one pipeline according to the invention is provided. Here, it is arranged in a path of the thick matter which is delivered by the thick-matter pump, that is to say within the delivery line, for example relatively far to the front at the start of the delivery line. Here, a pressure in the line during the delivery of thick matter is usually greatest because the start of the delivery line usually also lies at the lowest height level. Therefore, the susceptibility to wear is also greatest here in addition to the pressure, with the result that, above all, wear in the delivery line should be detected here by way of a pipeline according to the invention which is used.

In order then for a pressure in the pipeline and/or a wall thickness and therefore wear in the pipeline to be detected by way of a pipeline according to the invention, a length change of the first strain gauge and a length change of the second strain gauge in the circumferential direction of the pipeline and/or in the longitudinal direction of the pipeline are determined. A length change of this type can be relative or absolute, in particular depending on the type of strain gauge. Then, a first wall thickness of the first longitudinal section can be determined with use of this detected length change of the two strain gauge. To this end, Poisson's ratio of the material of the pipeline can be used, and a difference or a disparity between the first wall thickness and the second wall thickness can likewise be used. This is actually inherently obvious.

In a further refinement of the invention, the pressure within the first longitudinal section can be determined from the determined first wall thickness, at least the length changes in the circumferential direction, whether they are then relative or absolute, and Poisson's ratio of the material of the pipeline. This serves precisely for the above-described detection of blockages in a delivery line of the thick-matter pump. In a similar way, the pressure within the second longitudinal section can be determined with additional use of the difference between the first wall thickness and the second wall thickness. If the first pressure and the second pressure are then averaged, a pressure within the entire pipeline can be determined, at least an average pressure and a maximum pressure as a type of pressure peak. It can be provided here that, for the case where there is an above-described inner pipe within the pipeline, the wall thickness of this inner pipe is added to the first wall thickness and to the second wall thickness. Finally, this inner pipe also has to be expanded in a similar manner as if the pipeline per se had a correspondingly greater wall thickness.

In one advantageous refinement of the invention, it can be provided that, in the case of the calculations for the two longitudinal sections of the pipeline, as have previously been explained, the length changes of the strain gauge in the longitudinal direction of the pipeline and in the circumferential direction of the pipeline are taken into consideration, whether they are then relative or absolute length changes. This advantageously takes place by the length change in the circumferential direction being added for a longitudinal section in each case to the product of the length change in the longitudinal direction, whether they are then relative or absolute, and Poisson's ratio, it also being possible for this length change to be taken in each case as relative or absolute as is also the case otherwise. This sum is multiplied by the difference of the wall thicknesses, this result then in turn being divided by the difference between the product of the length change in the longitudinal direction and Poisson's ratio plus the length change in the circumferential direction for the first longitudinal section, and the product of the length change in the longitudinal direction and Poisson's ratio plus the length change in the circumferential direction for the second longitudinal section. A formula, as explained in the description in respect of FIG. 2, can particularly advantageously be used for the two longitudinal sections of the pipeline.

The complexity of this calculation is manageable, and it can be carried out by a corresponding processor in a rapid and, above all, also very accurate manner.

The second longitudinal section with the greater wall thickness advantageously tends to be situated approximately in the central region of the pipeline, or the center of the pipeline lies in this second longitudinal section with the greater second wall thickness.

Apart from the claims, these and further features are also apparent from the description and the drawings, it being possible for the individual features to be implemented in each case per se on their own or in multiples in the form of a subcombination in the case of one embodiment of the invention and in other fields, and for embodiments which are advantageous and potential per se to be presented, for which protection is claimed here. The division of the application into individual sections and intermediate titles do not limit the general validity of the statements made under them.

BRIEF DESCRIPTION OF THE DRAWINGS

Exemplary embodiments of the invention are shown diagrammatically in the drawings and will be described in greater detail in the following text.

DETAILED DESCRIPTION OF THE EXEMPLARY EMBODIMENTS

Figure 1:
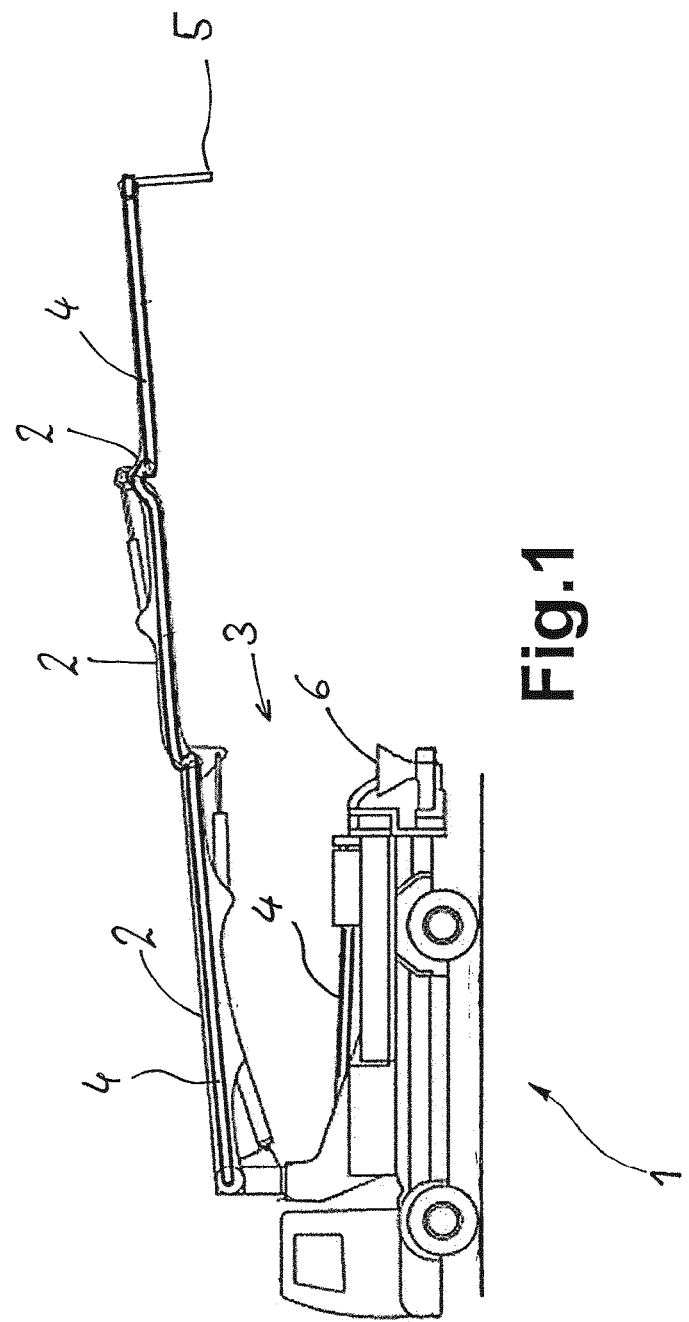
FIG. 1 shows a diagrammatic illustration of a thick-matter pump according to an embodiment of the invention on a vehicle with a boom arm and a delivery line thereon.

FIG. 1 shows a vehicle which has a tripartite boom arm 2 and a concrete pump 3. The concrete pump 3 is the thick-matter pump, and has a multiple-part delivery line 4 on the boom arm 2, which delivery line 4 opens into a line end 5. Pumped or delivered concrete can exit here. To this end, the concrete is pumped into the delivery line 4 by a pumping apparatus 6. Depending on the length of the entire delivery line 4 and, above all, also the height of the line end 5, a different pressure recognizably has to be applied by the pumping apparatus 6, possibly a very high pressure, as is known. Above all in the case of pumping of concrete, as was explained at the outset, the line is loaded greatly on its inner side and, as it were, is worn or abraded. The wall thickness therefore actually decreases. If a blockage then occurs as explained at the outset, the pressure rises greatly and there is therefore the risk that, at high pressure, the delivery line 4 can burst at a particularly thin location. This leads to the risks mentioned at the outset. The aim is therefore to avoid this, with the result that there is a desire to find out how pronounced the wear on the inside in the delivery line is and/or how greatly a wall thickness has possibly already been reduced. Furthermore, it would of course be very advantageous for it to be possible for an abovementioned sudden pronounced pressure rise to be detected very rapidly, in order to shut down or switch off the pumping apparatus 6.

A pipeline can be inserted at any desired location into the delivery line 4 which is shown in FIG. 1, which pipeline then, as it were, serves in a representative manner for the entire delivery line to detect wear with regard to a reduction in the wall thickness. Furthermore, the pressure within the delivery line 4 is also to be capable of being detected in this way.

Figure 2:
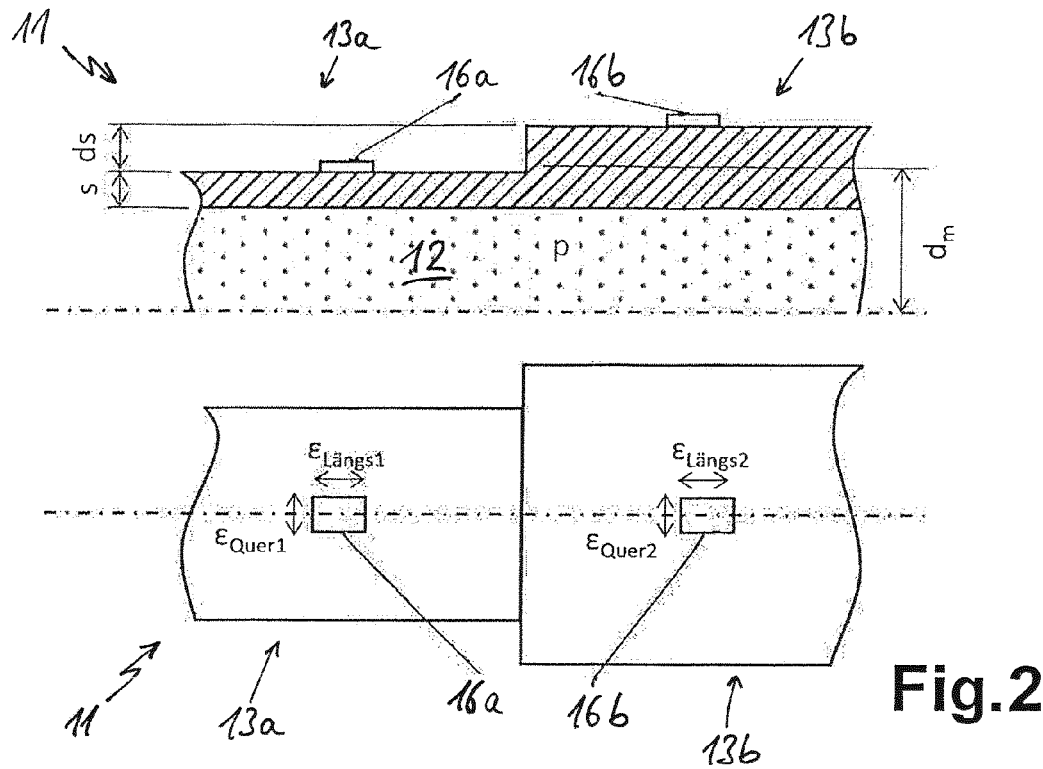
FIG. 2 shows a section and a top view of a first embodiment of a pipeline according to the invention with two longitudinal sections of different thickness in the case of an embodiment of the pipeline in one part.

A pipeline of this type is shown in details in FIG. 2 in a first embodiment of the invention. This pipeline 11 can be, for example, 1 m in length, and can be mounted in an easily removable manner in the lower region of the delivery line 4, for example upstream of the boom arm 2 or at the lowermost member of the boom arm 2.

The pipeline 11 is advantageously an exactly straight pipe, and can advantageously have a radially symmetrical cross section. An internal cross section is advantageously circular; the external cross sections are particularly advantageously also circular. There are recognizably two longitudinal sections 13a on the left and 13b on the right which can each case also be continued with any desired length. The left-hand first longitudinal section 13a has a wall thickness s. The right-hand second longitudinal section 13b has a wall thickness s+ds, and is somewhat more than twice as thick here as what is shown by FIG. 2. The mean diameter of the pipeline 11 in the second longitudinal section 13b is $d_m$, this diameter $d_m$ being shown only partially here. A thick matter 12, advantageously concrete, is shown centrally in the pipeline by way of the dotting.

As can also be seen from the top view (shown at the bottom in FIG. 2) of the pipeline 11, a first strain gauge strip 16a is applied to the first longitudinal section 13a, and a second strain gauge strip 16b is applied to the longitudinal section 13b, which strain gauge strips are identical here. The top view shows that the two strain gauge strips 16a and 16b are arranged with an exactly identical longitudinal orientation, namely along the center axis which is shown using a dash-dotted line. Here, the two strain gauge strips 16a and 16b are recognizably configured to be somewhat longer than wide, with the result that their extent in the longitudinal direction of the pipeline 11 is greater by approximately from 30% to 50% than their extent in the transverse direction with respect thereto. These two strain gauge strips are advantageously configured as explained above, namely with in each case two part strain gauge strips which run at a right angle with respect to one another. They can therefore detect an elongation in two directions at a right angle with respect to one another, and therefore possibly also an elongation in a two-dimensional plane.

The strain gauge strips 16a and 16b in each case have a relative length change $\varepsilon_{längs1}$ and $\varepsilon_{längs2}$ in the longitudinal direction of the pipeline 11, that is to say along two part strain gauge strips, and a relative length change $\varepsilon_{quer1}$ and $\varepsilon_{quer2}$ in the direction perpendicularly with respect thereto, that is to say along the two other part strain gauge strips. The strain gauge strips 16a and 16b are applied over the full surface area and fixedly to the outer side of the pipeline 11 in the longitudinal sections 13a and 13b, for example are adhesively bonded in a stable and durable manner. This is generally known for strain gauge strips. They advantageously operate with variable resistances, a corresponding contacting and electric evaluation not being shown here. This is easy for a person skilled in the art to realize, however, with standard solutions for the evaluation of strain gauge strips.

The calculation of the wall thickness s according to FIG. 2 is set forth in the following text. It is assumed here that the pressure P in the first longitudinal section 13a corresponds to the pressure P in the second longitudinal section 13b, with the result that the two can be made equal.

By way of Barlow's Formula, the tangential tension results from the internal pressure, from the mean diameter and the wall thickness of a pipe $$\sigma_t = \frac{P * d_m}{2 * s}$$

| | |
|---|---|
| P | pipe internal pressure |
| $d_m$ | mean diameter |
| s | wall thickness of the pipe |

The tangential tension is not distorted by bends or axial loads on the pipe. In order for it to be possible for it to be measured correctly, the measurement of two elongations in two directions is required in the two-dimensional tension state:

$$\varepsilon_t + \varepsilon_a * \vartheta = \frac{\sigma_t}{E} * (1 - \vartheta)^2$$

| | |
|---|---|
| $\varepsilon_t$ | elongation in tangential direction |
| $\varepsilon_a$ | elongation in axial direction |
| $\vartheta$ | Poisson's ratio |
| $\sigma_t$ | tension in tangential direction |
| E | modulus of elasticity |

Reworked:

$$\frac{(\varepsilon_t + \varepsilon_a * \vartheta) * E}{(1 - \vartheta)^2} = \sigma_t$$

Applied:

$$\frac{(\varepsilon_t + \varepsilon_a * \vartheta) * E}{(1 - \vartheta)^2} = \frac{P * d_m}{2 * s}$$

If the formula is derived twice (with s1 and s2=s1+ds as wall thickness). Here, $d_{m1} \approx d_{m2}$ has approximately been given a constant value. It is likewise possible, however, even if it is more complex mathematically, to perform the calculation using the exact value.

$$P_1 = \frac{(\varepsilon_{t1} + \varepsilon_{a1} * \vartheta) * E * 2 * s_1}{(1 - \vartheta)^2 * d_{m1}}$$

$$P_2 = \frac{(\varepsilon_{t2} + \varepsilon_{a2} * \vartheta) * E * 2 * (s_1 + ds)}{(1 - \vartheta)^2 * d_{m2}}$$

Equated and resolved according to s1 and with $d_{m1}$ set to be approximately equal to $d_{m2}$, the result is:

$$s_1 = \frac{(\varepsilon_{t2} + \varepsilon_{a2} * \vartheta) * ds}{(\varepsilon_{t1} + \varepsilon_{a1} * \vartheta - \varepsilon_{t2} - \varepsilon_{a2} * \vartheta)(\varepsilon_{t2} + \varepsilon_{a2} * \vartheta)}$$

s1 can be determined with the aid of this equation. This value can then be smoothed. And P1 and P2 can then be determined with the aid of the above equations. These pressures P1 and P2 should be identical; a mean value can be used in the evaluation, and the difference between the two values can serve as a sensor control. As an alternative, a longitudinal strain gauge strip can also be dispensed with if P1=P2 is set and the missing elongation is determined from the formula. Here, the elongation in the tangential direction $\varepsilon_t$ corresponds to $\varepsilon_{Quer}$, and the elongation in the axial direction $\varepsilon_a$ corresponds here to $\varepsilon_{längs}$, to be precise in each case in relation to the two longitudinal sections 13a and 13b.

Figure 3:
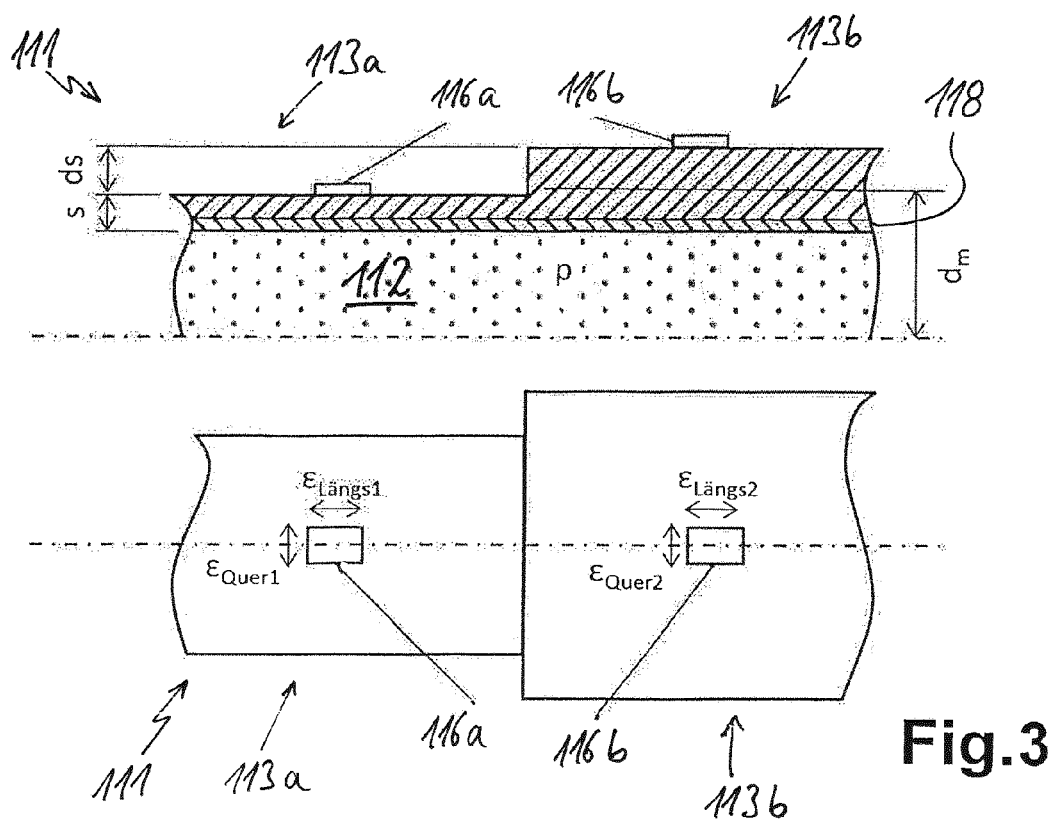
FIG. 3 shows another embodiment of the invention, similar to FIG. 2, with a wear-resistant inner pipe.

In FIG. 3 below FIG. 2, an alternative pipeline 111 is shown which once again has a radially symmetrical cross section and a circular cross section for the delivery of thick matter 112 therein. On the left-hand side, a first longitudinal section 113a with a first strain gauge strip 116a is provided. After this, a second longitudinal section 113b with a second strain gauge strip 116b is adjacent on the right with a hard stepped transition. On the inside, the pipeline 111 is provided with a continuous inner pipe 118. This inner pipe hundred 18 consists of a more wear-resistant material than the pipeline 111 per se. Furthermore, it can be removed as a wear part from the pipeline 111, for example because it has shrunk thermally, as soon as it wears to an excessive extent or has even worn through. It can then be replaced by a new inner pipe 118, whereas the remaining pipeline 111 can continue to be used, in particular even with the complex adhesively bonded strain gauge strips 116a and 116b.

For the above-described mathematics or calculation of a pressure or an elongation or wall thickness of the pipeline 111, a wall thickness of the first longitudinal section 113a can be used together with the inner pipe 118s as the basis taking into account the specifications from FIG. 2. In the second longitudinal section 113b, the wall thickness is then s+ds as shown. It can also be seen from this that the wall thickness of the inner pipe 118 is added as it were in full to the wall thickness of the pipeline 111. The added wall thicknesses s and s+ds can be seen in a similar manner as in FIG. 2.

As can be seen from the lower illustration of FIG. 3, the arrangement and the orientation of the strain gauge strips 116a and 116b are as shown in FIG. 2. Furthermore, these two strain gauge strips 116a and 116b are also of identical configuration with respect to one another here, and are advantageously adhesively bonded on the outside.

Figure 4:
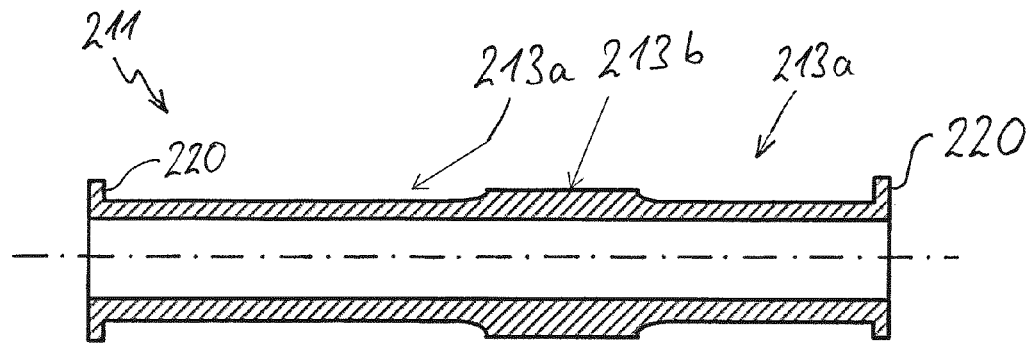
FIG. 4 shows an illustration of a pipeline according to an embodiment of the invention, similar to FIG. 1, with two different longitudinal sections with in each case a different wall thickness.

FIG. 4 shows a simplified illustration of a pipeline 211. It can be, for example, 1 m long and can have a diameter of approximately 20 cm. The pipeline 211 is provided at the ends in each case with flanges 220 which are integrally formed in one piece, as known per se. They serve to connect to the pipeline 211 to other pipelines or the delivery line in a known way.

The pipeline 211 largely has a first longitudinal section 213a; a longitudinal section 213b with a discernibly thicker wall thickness is provided only in the center or somewhat to the right of the center. The pipeline 211 is configured in one piece here. The transition of the wall thickness between the middle longitudinal section 213b and the adjacent longitudinal sections 213a on the left and right thereof is not stepped according to FIGS. 2 and 3, but rather is rounded somewhat. This can improve the mechanical properties of the pipeline 211 with regard to stability. The longitudinal extent of the longitudinal section 213b is approximately from 15% to 20% of the entire pipeline 211. There wall thickness is approximately 150% of that of the first longitudinal section 213a.

The illustration of strain gauge strips is also dispensed with here; they are arranged in the longitudinal section 213b and at least one of the longitudinal sections 213a, advantageously in accordance with FIGS. 2 and 3.

Figure 5:
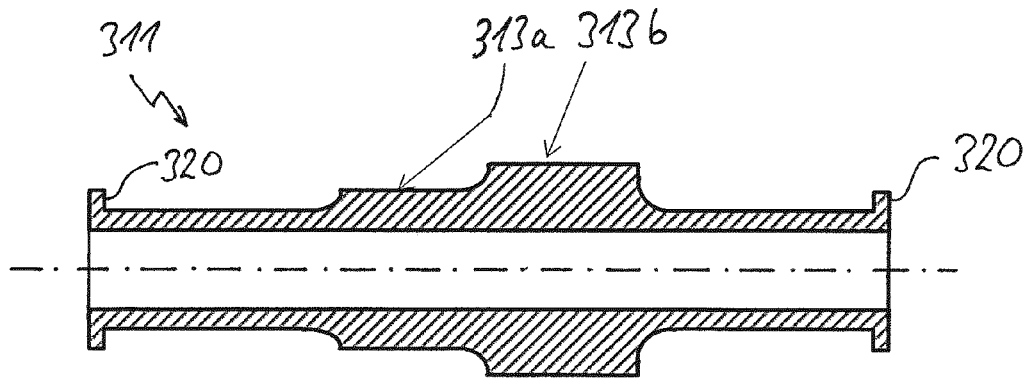
FIG. 5 shows a further pipeline according to an embodiment of the invention with four different longitudinal sections with in each case three different wall thicknesses.

FIG. 5 shows a further pipeline 311 according to an embodiment of the invention with flanges 320 at the ends, as described previously in respect of FIG. 4. Even more different wall thickness regions are provided here, the wall thickness of the pipeline 311 first of all being relatively thin starting from the left. There is then a rounded rise to a wall thickness which is thicker by approximately from 50% to 70% in the longitudinal section 313a. After approximately from 15% to 20% of the length of the entire pipeline 311, there is once again a rounded rise of the wall thickness to the longitudinal section 313b, the two longitudinal sections 313a and 313b being of approximately identical length. The wall thickness of the longitudinal section 313b is approximately 50% more. There is then a rounded transition to the relatively thin wall thickness of the original pipeline 311 as far as the right-hand flange 220. In the case of this pipeline 211, strain gauge strips are advantageously attached in accordance with FIGS. 2 and 3 in the longitudinal sections 313a and 313b, but are not illustrated here. A further strain gauge strip might also be applied directly on the pipeline 311 on the left or the right of the two longitudinal sections, in a similar manner to that described for FIG. 4. Two strain gauge strips are as a rule considered to be sufficient, however.

Figure 6:
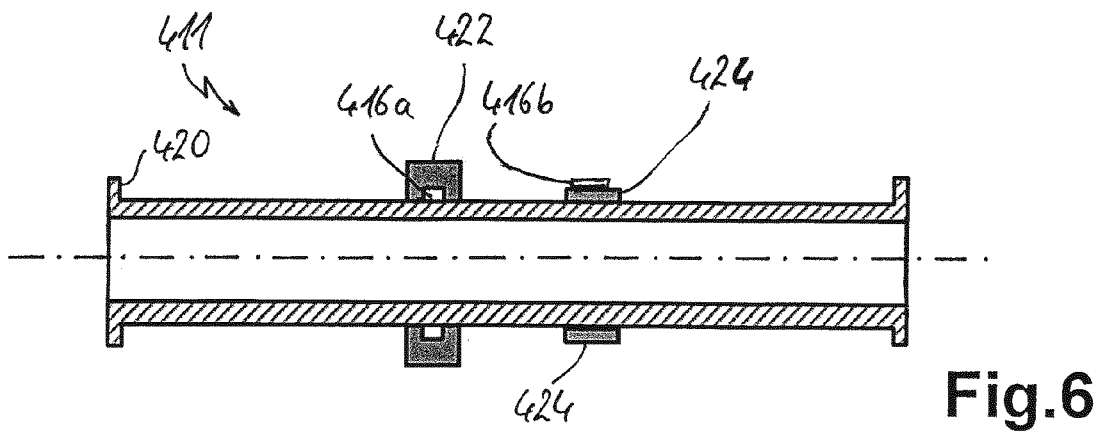
FIG. 6 shows a further pipeline according to an embodiment of the invention with a thick cuff, which is attached to a continuous pipe, and a clip with strain gauge strips.

FIG. 6 shows yet a further pipeline 411 according to an embodiment of the invention which likewise has flanges 420 for fastening at the left-hand end and at the right-hand end. Here, no regions with an increased wall thickness are provided on the pipeline 411 which is provided per se continuously with a constant cross section, but rather a thick reinforcing ring 422 which is shrink-fitted or adhesively bonded is provided on the left-hand side. Below the latter, advantageously in a corresponding recess, a left-hand strain gauge strip 416a can be situated which is protected, for example, by way of the reinforcing ring 422. The strain gauge strip 416a then measures per se, however, only on the external diameter of the pipeline 411 per se, with the result that the thickness of the reinforcing ring 422 does not influence this measurement or has no effects on it.

Figure 7:
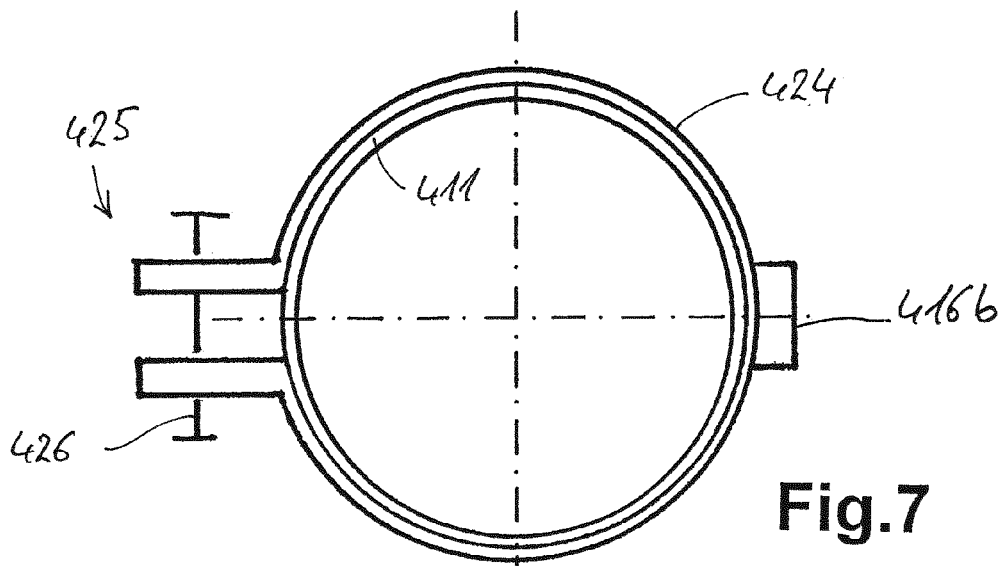
FIG. 7 shows a section through a pipeline according to an embodiment of the invention with a clip which is attached to it and on the outer side of which a strain gauge strip is arranged.

On the right-hand side next to the reinforcing ring 422, a clip 424 is placed onto the pipeline 411 and is fastened so as to bear tightly against it, as is also shown by the sectional illustration of FIG. 7. The clip 424 is configured in a customary way, and runs largely around the pipeline 411 apart from a narrow spacing in the region of projecting fastening sections 425. The latter are braced by way of a diagrammatically indicated screw 426, with the result that the clip 424 is seated fixedly on the pipeline 411. In a similar manner to the second longitudinal section 213b according to FIG. 4, it therefore also counts as an increase in the wall thickness of the pipeline in this region, because a strain gauge strip 416b is applied on the clip 424 on the outside. This strain gauge strip 416b can then carry out the measurement according to the invention directly on the pipeline 411, for example together with the abovementioned first strain gauge strip 416a.

Figure 8:
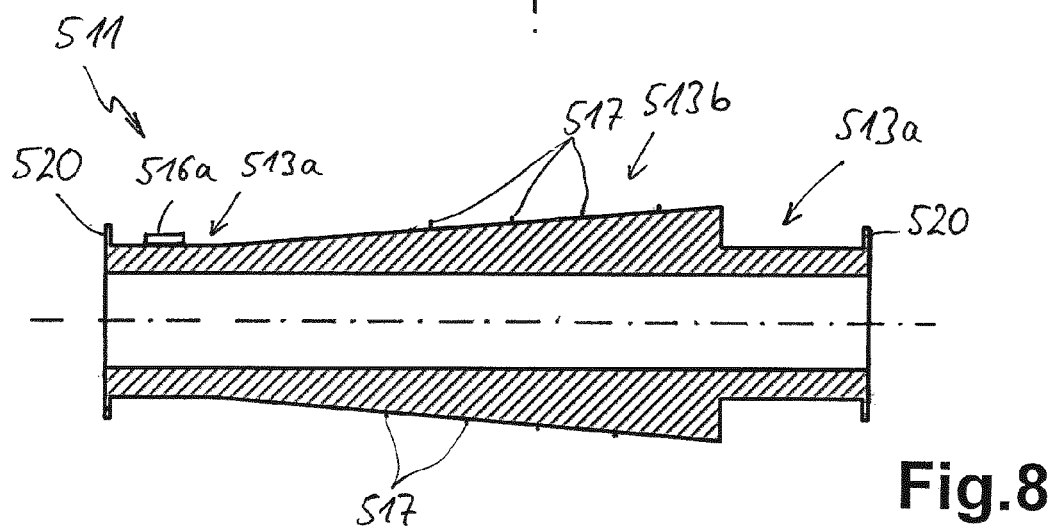
FIG. 8 shows a further pipeline according to an embodiment of the invention with a conically uniformly increasing wall thickness including a spirally wound glass fiber in the sectional illustration.
Figure 9:
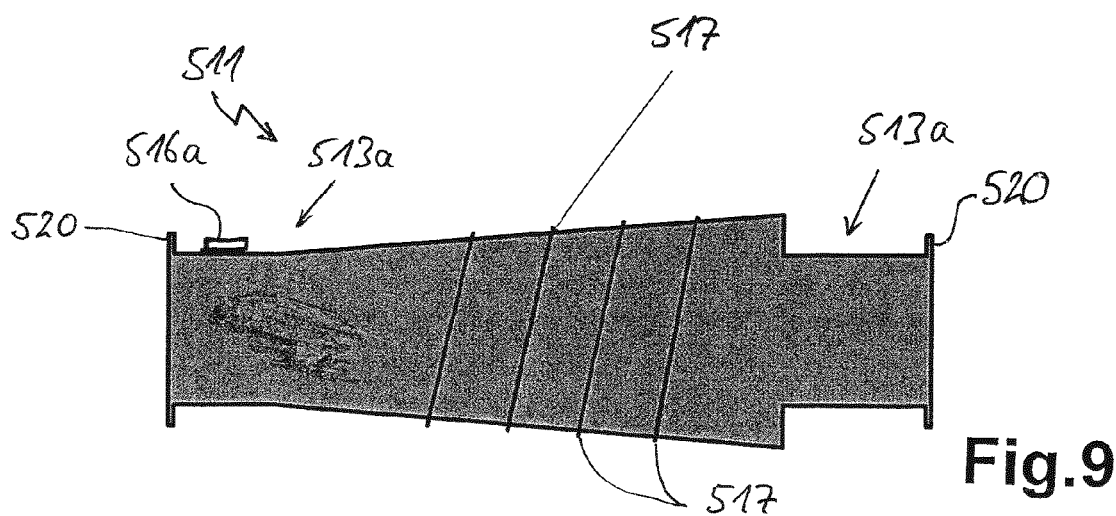
FIG. 9 shows a view from the outside of the pipeline from FIG. 8.

FIGS. 8 and 9 show yet a further modification of a pipeline 511 according to an embodiment of the invention which in each case has a first longitudinal section 513b in a manner which runs inward and adjoins flanges 520 at the ends, approximately in a similar manner to FIG. 5. A second longitudinal section 513b lies in between, which has a greater wall thickness which is not constant or uniform, however. Rather, the wall thickness rises continuously here, starting at the wall thickness of the first longitudinal section 513a as far as a wall thickness on the far right which is approximately from 200% to 250% thereof, that is to say is considerably thicker. Here, a first strain gauge strip 516a can either be arranged in the first longitudinal section 513a. As an alternative, an elongate glass fiber can be wound spirally in the second longitudinal section 513b with approximately four windings, as is shown here. A plurality of reflection planes can be used in the glass fiber 517, which are produced by way of manufacturing defects which occur during the glass fiber production, or this is possible by way of artificially introduced partially reflecting mirrors. This has been explained at the outset. This results in different longitudinal elongations or a length change on the sections of the spirally wound glass fiber, which can be recorded and offset. At least two measurements can be performed by way of the specific conical shape of the pipeline 411.

This glass fiber 517 is connected to a measuring apparatus and is closed off at one end in such a way that the length of the individual sections, into which it is divided by way of the reflection planes and/or the partially reflecting mirrors, can be determined exactly by way of a light signal which passes to and fro. Since the glass fiber 517 is connected along its length in a completely firm manner to the outer side of the pipeline 511 or the second longitudinal section 513b, it stretches accordingly with the widening of the pipeline or longitudinal section 513b. This widening of the pipeline longitudinal section is different, depending on how thick they are in each case on account of the conical shape. It results after all from the wall thickness described at the outset which decreases continuously in the direction to the left in the second longitudinal section 513b, as a result of which the strength of the pipeline decreases and it can therefore be elongated to a more pronounced extent as a result of the pressure of the thick matter which is delivered therein. Here, the calculation of a respective wall thickness takes place in the case of a glass fiber 517 of this type as a strain gauge in a similar manner to that stated above, namely also by way of its changing or rising length. The glass fiber 517 is merely divided differently into individual sections with a respective determinable length and length change. The wall thickness can also be calculated therefrom in all cases, possibly on the basis of stored comparison values.

The invention claimed is:

1. A pipeline for delivery of thick matter, comprising:
    a first longitudinal section of the pipeline with a first wall thickness;
    a second longitudinal section of the pipeline with a second wall thickness which is greater than the first wall thickness;
    a first strain gauge on an outer side of the first longitudinal section;
    a second strain gauge on an outer side of the second longitudinal section, wherein
    the strain gauges are attached in each case fixedly on the longitudinal sections or are attached on outer sides of the longitudinal sections, and
    the strain gauges are used for determining a pressure in the pipeline and/or a wall thickness of the pipeline, wherein
    at least one strain gauge and/or the second longitudinal section of the pipeline are/is at a spacing from at least one end of the pipeline, which spacing corresponds to at least an internal diameter of the pipeline.

2. The pipeline according to claim 1, wherein
    the strain gauges are attached on the outer side of the longitudinal sections by way of at least one of: adhesive bonding, screwing, soldering, shrink-fitting, and fastening via a clip which engages over the gauges in a circumferential direction of the pipeline.

3. The pipeline according to claim 1, wherein the first strain gauge and the second strain gauge extend in the same direction and/or their working direction or their measuring direction is the same.

4. The pipeline according to claim 1, wherein the strain gauges extend in a circumferential direction of the pipeline and their working direction or their measuring direction extends in the circumferential direction.

5. The pipeline according to claim 1, wherein the strain gauges are selected from a group comprising: strain gage strips, electrically conductive wires, force-measuring press-fit sensors, and glass fibers.

6. The pipeline according to claim 1, wherein the spacing corresponds to at least twice the internal diameter of the pipeline.

7. The pipeline according to claim 1, wherein at least one strain gauge is a strain gauge strip which has a plurality of part strips which in each case form a part strain gauge strip with sensitivity along in each case precisely one direction.

8. The pipeline according to claim 7, wherein the plurality of part strips comprise two part strips which run at a right angle with respect to one another.

9. The pipeline according to claim 1, wherein an internal diameter of the two longitudinal sections are identical, the pipeline being straight.

10. The pipeline according to claim 1, wherein the pipeline has only the first longitudinal section and the second longitudinal section, and no other or further longitudinal sections with a different wall thickness and/or a different internal diameters.

11. The pipeline according to claim 1, wherein the first longitudinal section adjoins the second longitudinal section directly by way of a transition in wall thickness, the transition between the first wall thickness and the second wall thickness is abrupt as a step with a radius on the interior angle of at least 10% of the internal diameter of the pipeline.

12. The pipeline according to claim 1, further comprising: a flange at at least one end of the pipeline for connection to further lines.

13. The pipeline according to claim 1, wherein the first longitudinal section and the second longitudinal section are produced in one piece and as one part.

14. The pipeline according to claim 1, wherein the first longitudinal section and/or the second longitudinal section in each case have a constant wall thickness.

15. The pipeline according to claim 1, wherein the second wall thickness is from 10% to 30% more than the first wall thickness.

16. The pipeline according to claim 1, wherein the second wall thickness is from 75% to 250% more than the first wall thickness.

17. The pipeline according to claim 1, wherein a continuous inner pipe is arranged in the pipeline with a constant internal diameter and a constant wall thickness, the wall thickness of the inner pipe being smaller than the first wall thickness, the inner pipe bearing flatly against the inner side of the two longitudinal sections.

18. The pipeline according to claim 17, wherein the inner pipe is of more wear-resistant configuration than the pipeline in respect of wear resistance on the inner side with regard to material which flows through.

19. A thick-matter pump, comprising:
a pipeline according to claim 1;
a delivery line for delivery of thick matter;
wherein the pipeline is arranged in a path of the delivered thick matter within the delivery line.

20. A pipeline for delivery of thick matter, comprising:
a first longitudinal section of the pipeline with a first wall thickness;
a second longitudinal section of the pipeline with a second wall thickness which is greater than the first wall thickness;
a first strain gauge on an outer side of the first longitudinal section;
a second strain gauge on an outer side of the second longitudinal section, wherein
the strain gauges are attached in each case fixedly on the longitudinal sections or are attached on outer sides of the longitudinal sections, and
the strain gauges are used for determining a pressure in the pipeline and/or a wall thickness of the pipeline, wherein
the first strain gauge and the second strain gauge are elongate, and their length is greater than their width, and
the two strain gauges are attached with the same orientation on the pipeline with an extent in accordance with their longitudinal direction along the longitudinal direction of the pipeline.

21. A pipeline for delivery of thick matter, comprising:
a first longitudinal section of the pipeline with a first wall thickness;
a second longitudinal section of the pipeline with a second wall thickness which is greater than the first wall thickness;
a first strain gauge on an outer side of the first longitudinal section;
a second strain gauge on an outer side of the second longitudinal section, wherein
the strain gauges are attached in each case fixedly on the longitudinal sections or are attached on outer sides of the longitudinal sections, and
the strain gauges are used for determining a pressure in the pipeline and/or a wall thickness of the pipeline, wherein
the pipeline has a pipe with a continuously constant first wall thickness which forms the first longitudinal section, and
an outer pipe is placed onto the pipe as a cuff with a wall thickness in accordance with the difference between the first wall thickness and the second wall thickness to form the second longitudinal section.

* * * * *